United States Patent [19]

Dietz et al.

[11] Patent Number: 5,264,034
[45] Date of Patent: Nov. 23, 1993

[54] PIGMENT PREPARATIONS BASED ON PERYLENE COMPOUNDS

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 829,046

[22] PCT Filed: Aug. 9, 1990

[86] PCT No.: PCT/EP90/01311

§ 371 Date: Mar. 6, 1992

§ 102(e) Date: Mar. 6, 1992

[87] PCT Pub. No.: WO91/02034

PCT Pub. Date: Feb. 21, 1991

[30] Foreign Application Priority Data

Aug. 11, 1989 [DE] Fed. Rep. of Germany ....... 3926564

[51] Int. Cl.$^5$ .................. C07D 471/06; C07D 491/06; C07D 493/06
[52] U.S. Cl. .................. 106/493; 106/494; 106/498; 106/20 R; 106/23 R; 106/23 C; 106/23 H; 524/90; 524/92; 524/287; 524/590; 524/602; 524/839; 524/845; 524/879; 528/288; 523/202; 546/37
[58] Field of Search ............. 106/498, 494, 493, 20 R, 106/23 R, 23 C, 23 H; 546/37; 523/20 R; 524/90, 92, 287, 590, 602, 839, 845, 879; 528/288

[56] References Cited

U.S. PATENT DOCUMENTS

| | | |
|---|---|---|
| 2,543,747 | 3/1951 | Shrader ................. 546/37 |
| 2,905,685 | 9/1959 | Eckert et al. ............ 546/37 |
| 4,256,507 | 3/1981 | Kranz et al. ............ 106/495 |
| 4,310,359 | 1/1982 | Ehashi et al. ........... 106/494 |
| 4,431,806 | 2/1984 | Spietschka et al. ....... 546/37 |
| 4,496,731 | 1/1985 | Spietschka et al. ....... 546/37 |
| 4,692,189 | 9/1987 | Bäbler et al. ........... 106/494 |
| 4,762,569 | 8/1988 | Miki et al. ............. 106/476 |
| 4,978,755 | 12/1990 | Bäbler et al. ........... 546/37 |

FOREIGN PATENT DOCUMENTS

| | | |
|---|---|---|
| 0039912 | 1/1983 | European Pat. Off. . |
| 0088392 | 12/1984 | European Pat. Off. . |
| 1067157 | 10/1959 | Fed. Rep. of Germany . |
| 1113773 | 3/1962 | Fed. Rep. of Germany . |
| 2905114 | 7/1980 | Fed. Rep. of Germany . |
| 3703513 | 8/1988 | Fed. Rep. of Germany . |
| 3106906 | 5/1990 | Fed. Rep. of Germany . |
| 62-197461 | 9/1987 | Japan . |

OTHER PUBLICATIONS

Chemical Abstracts 109:212376w; Abstract of "Water-Soluble Perylene-tetracarboxylic acid bisimide Fluorescent Dyes", DE 3,703,513, Aug. 1988.

*Primary Examiner*—Mark L. Bell
*Assistant Examiner*—Scott L. Hertzog

[57] ABSTRACT

Pigment preparations consisting essentially of (a) at least one pigment based on perylene-3,4,9,10-tetracarboxylic dianhydride or on corresponding monoimides or diimides of tetracarboxylic acid monoanhydride, or a halogenation product thereof, (b) at least one pigment dispergent based on perylene-3,4,9,10-monoimide substituted on one or both imide nitrogen atoms by alkylene or arylene sulphonic or carboxylic acid groups or on corresponding diimides of tetracarboxylic acid monoanhydride, or a halogenation product thereof. The dispergents used appreciably enhance the key properties of perylene pigments, such as dispersibility, coloring power, stability to flocculation, transparency, rheological behavior and surface properties of the application medium. These new preparations are suitable for the pigmentation of high-quality lacquers and synthetic resins.

20 Claims, No Drawings

PIGMENT PREPARATIONS BASED ON PERYLENE COMPOUNDS

The present invention relates to novel, useful pigment preparations which are based on perylene compounds and have improved coloristic and rheological properties, a process for their preparation and their use for pigmenting high molecular weight organic materials.

A large number of technological problems may arise when dispersing pigments in high molecular weight materials, in particular high-quality varnishes. In the case of pigments which agglomerate to a high degree and are difficult to disperse, for example, the dispersion usually remains incomplete and the optimum fineness and tinctorial strength are not achieved. Because of such inadequacies, there are a number of proposals for improving the rheological properties of pigments, although these do not always lead to the hoped-for result.

It is thus known from DE-OS 31 06 906 that pigment preparations having outstanding coloristic properties can be obtained by combining pigments of various classes of organic compound with structurally analogous pigment derivatives which have been substituted by introduction of one or more sulfonamide radicals into the underlying molecule. However, the preparation of the perylene type based on C.I. Pigment Red 179 described as an example, inter alia, in that specification still has considerable coloristic and rheological deficiencies with respect to the increased demands of industry.

Pigment preparations from the category of perylene compounds which are prepared by mixing such pigments with corresponding derivatives in which a phthalimidomethylene radical is additionally present are in turn described in DE-AS 29 05 114. The coloristic result of this variation achieved by this procedure continued to remain unsatisfactory, in particular in respect of the dark and cloudy color shade.

Finally, the published Japanese Patent Application 62/197461 (1987) describes the production of preparations based on perylene pigments by adding a pigment-dispersing agent obtainable by reaction of perylenetetracarboxylic acid dianhydride with N-dialkylaminoalkylamines. Nevertheless, it is also possible to achieve only slight rheological improvements with the aid of these pigmentdispersing agents.

From the aspect of the experiences discussed above, the object of the invention defined below was thus further development of pigment preparations of the perylene type which are directed toward their intended use.

In achieving the object described, it has now been found that by the co-action of pigment-dispersing agents based on sulfonated and/or carboxylated perylene compounds, coloristic and rheological properties superior to the standard to date can be imparted to the perylene pigment preparations prepared with these compounds.

The invention relates to pigment preparations characterized by the fact that they contain
a) as the base pigment at least one perylene compound of the general formula I

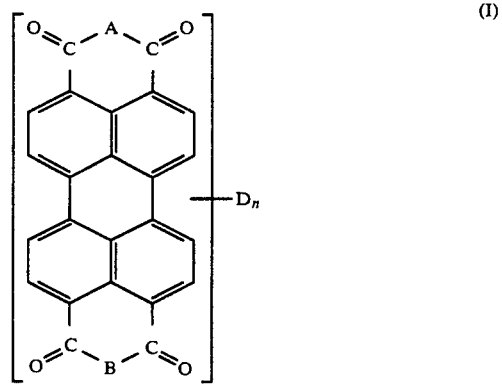

in which
A is a bivalent radical —O— or >NR$^1$ and
B is a bivalent radical —O— or >NR$^2$,
D is a chlorine or bromine atom, and if n>1, optionally a combination thereof, and
n is a number from 0 to 4;
in which, in the above radicals A and B, then
R$^1$ and R$^2$ independently of one another are each a hydrogen atom or a C$_1$-C$_4$-alkyl group, or a phenyl group, which can be unsubstituted or mono- or polysubstituted by halogen, such as chlorine or bromine, C$_1$-C$_4$-alkyl, such as methyl or ethyl, C$_1$-C$_4$-alkoxy, such as methoxy or ethoxy, or phenylazo; and
b) as the pigment-dispersing agent at least one perylene compound of the general formula II

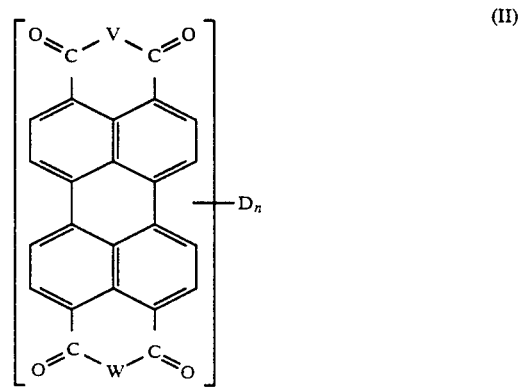

in which
V is a bivalent radical —O—, >NR$^3$ or >N—R$^4$—Y$^-$X$^+$ and
W is the bivalent radical >N—R$^4$—Y$^-$X$^+$,
D is a chlorine or bromine atom, and if n>1, optionally a combination thereof, and
n is a number from 0 to 4;
in which, in the above radicals V and W, then
R$^3$ is a hydrogen atom or a C$_1$-C$_{18}$-alkyl group, in particular C$_1$-C$_4$-alkyl, or is a phenyl group, which can be unsubstituted or mono- or polysubstituted by halogen, such as chlorine or bromine, C$_1$-C$_4$-alkyl, such as methyl or ethyl, C$_1$-C$_4$-alkoxy, such as methoxy or ethoxy, or phenylazo,
R$^4$ is a C$_1$-C$_{18}$-alkylene group, which can be interrupted once or several times within the C—C chain by a bridge member from the series comprising —O—, —NR$^5$—, —S—, phenylene, —CO—, —SO$_2$— and —$CR^6R^7$—, or a chemically appropriate combination thereof, and in which in turn the constituents $R^5$, $R^6$ and $R^7$ independently of one another are each a hydrogen atom or a $C_1$-$C_4$-alkyl group, which can be unsubstituted or substituted by a heterocyclic radical, preferably of the imidazole or piperazine type, but in particular is a straight-chain or branched $C_1$-$C_6$-alkylene group, such as ethylene or propylene; or is a phenylene group, which can be unsubstituted or mono- or polysubstituted by $C_1$-$C_4$-alkyl, such as methyl or ethyl, or $C_1$-$C_4$-alkoxy, such as methoxy or ethoxy, $Y^-$ is one of the anionic radicals —$SO_3^-$ or —$COO^-$ and $X^+$ is the hydrogen ion $H^+$ or the equivalent m,

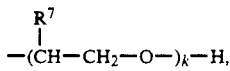

of a metal cation from main group 1 to 5 or from sub-group 1 or 2 or 4 to 8 of the periodic table of the chemical elements, in which m is one of the numbers 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Cd^{2+}$, $Co^{2+}$, $Zn^{2+}$, $Fe^{2+}$, $Al^{3+}$, $Cr^{3+}$, or $Fe^{3+}$; or is an ammonium ion $N^+R^8R^9R^{10}R^{11}$, in which the substituents $R^8$, $R^9$, $R^{10}$ and $R^{11}$ on the quaternary nitrogen atom independently of one another are each a hydrogen atom or a group from the series comprising $C_1$-$C_{30}$-alkyl, $C_1$-$C_{30}$-alkenyl, $C_5$-$C_{30}$-cycloalkyl, unsubstituted or $C_1$-$C_8$-alkylated phenyl or a (poly)alkylenoxy $$-(\overset{R^7}{\underset{|}{CH}}-CH_2-O-)_k-H,$$

in which $R^7$ is hydrogen or $C_1$-$C_4$-alkyl and k is a number from 1 to 30, and in which alkyl, alkenyl, cycloalkyl, phenyl or alkylphenyl designated as $R^8$, $R^9$, $R^{10}$ and/or $R^{11}$ can also optionally be substituted by amino, hydroxyl and/or carboxyl; or in which the substituents $R^8$ and $R^9$, together with the quaternary nitrogen atom, can form a five- to seven-membered saturated ring system, which optionally also contains further hetero atoms, such as an oxygen, sulfur and/or nitrogen atom, for example of the pyrrolidone, imidazolidine, hexamethyleneimine, piperidine, piperazine or morpholine type; or in which the substituents $R^8$, $R^9$ and $R^{10}$, together with the quaternary nitrogen atom, can form a five- to seven-membered aromatic ring system, which optionally also contains further hetero atoms, such as an oxygen, sulfur and/or nitrogen atom, and onto which additional rings are optionally fused, for example of the pyrrole, imidazole, pyridine, picoline, pyrazine, quinoline or isoquinoline type.

In this connection, pigment preparations which are to be described according to the invention are above all those in which the base pigment a) present is at least one perylene compound of the abovementioned general formula I in which A is a bivalent radical —O— or >$NR^1$ and
B is a bivalent radical —O— or >$NR^2$ and
D and n are as defined above, with the proviso that the particular meaning of the above radicals A and B is the same, and in which then $R^1$ and $R^2$ correspondingly are each a hydrogen atom or a group from the series comprising methyl or the structures

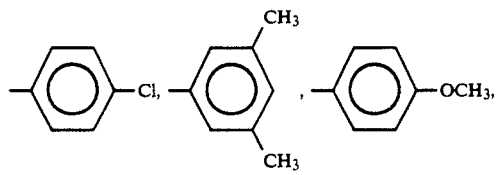

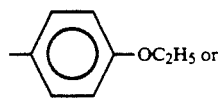

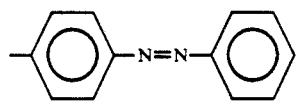

Pigment preparations which have acquired particular interest according to the invention are those in which the pigment-dispersing agent b) present is at least one perylene compound of the abovementioned general formula II in which V is a bivalent radical —O—, >$NR^3$ or >N—$R^4$—Y—$X^+$ and
W is the bivalent radical >N—$R^4$—Y—$X^+$ and
D and n are as defined above, in which, in the above radicals V and W, then
$R^3$ and $R^4$ have the abovementioned meaning,
$Y^-$ is one of the anionic radicals —$SO_3^-$ or —$COO^-$ and
$X^+$ is the hydrogen ion $H^+$ or the equivalent $$\frac{M^{m+}}{m}$$

of a metal cation of the chemical elements listed individually above, or is an ammonium ion $N^+R^8R^9R^{10}R^{11}$, in which the substituents $R^8$, $R^9$ and $R^{10}$ on the quaternary nitrogen atom independently of one another are each a hydrogen atom or the group $C_2$-$C_3$-hydroxyalkyl and $R^{11}$ is one of the groups from the series comprising $C_1$-$C_{30}$-alkyl, $C_1$-$C_{30}$alkenyl, $C_2$-$C_3$-hydroxyalkyl and $C_5$-$C_6$-cycloalkyl.

Pigment preparations which are classified according to the invention as being particularly useful are those in which the pigment-dispersing agent b) present is at least one halogen-free perylene compound of the abovementioned general formula II, in which, with an otherwise identical allocation of the meaning of the radicals V and W, the index n is thus the number 0, in which, for characterization of the radicals V and W in question, then $R^3$ in each case has the abovementioned meaning, but $R^4$—if $Y^-$ is the radical —$SO_3^-$—is a group from the series comprising ethylene or propylene or the structures

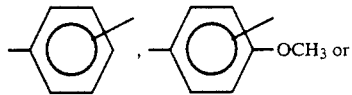

-continued

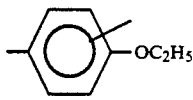

or —if $Y^-$ is the radical $-COO^-$ is a group from the series comprising $C_1-C_6$-alkylene or the structure

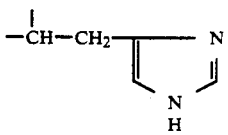

and within these two variants
$X^+$ is in each case a cation from the series

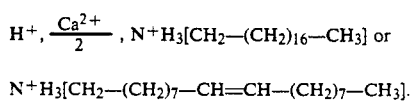

$N^+H_3[CH_2-(CH_2)_7-CH=CH-(CH_2)_7-CH_3]$.

Perylene compounds of the general formula II which contain sulfonic acid groups and are employed according to the invention as the pigment-dispersing agent b) can be prepared, for example, by known processes by sulfonation of suitable perylene derivatives, such as perylene-3,4,9,10-tetracarboxylic acid monoanhydride-monoamide or corresponding tetracarboxylic acid diimides, in which at least one imide nitrogen is unsubstituted, by means of concentrated sulfuric acid or fuming sulfuric acid (oleum), or by sulfochlorination of the perylene starting substances mentioned by means of chlorosulfonic acid, together with subsequent hydrolysis in water. The synthesis of such sulfonated and of carboxylated perylene compounds of the general formula II by condensation of, for example, perylene-3,4,9,10-tetracarboxylic acid with primary aliphatic or aromatic amines which contain sulfonic acid or carboxylic acid groups, of the formula $H_2N-R^4-Y^-X^+$, in which $R^4$, $Y^-$ and $X^+$ have the abovementioned meaning, has proved to be particularly suitable.

The amounts of pigment-dispersing agents b) to be added to the base pigments a) in the preparation of the pigment preparations according to this invention are not restricted—as long as the required pigment quality is not adversely influenced—but in general a content of 0.1 to 20% by weight, in particular 1 to 10% by weight, of dispersing agent, calculated with respect to the particular weight of pigment, is suitable.

In addition to the pigment a) and pigment-dispersing agents b), the pigment preparations claimed can also contain other constituents, such as, for example, surfactants, resins or antidust agents.

Pigment preparations in the context of the present invention thus essentially consist of
a) 99.5 to 80% by weight of at least one perylene compound of the formula I (base pigment),
b) 0.5 to 15% by weight of at least one perylene compound of the formula II (dispersing agent),
c) 0 to 5% by weight of a nonionic surfactant and
d) 0 to 5% by weight of customary additives,
the amounts of the particular components being based on the total weight of the preparation.

The pigment preparations claimed are as a rule solid systems having a free-flowing, pulverulent nature or granules.

The dispersing agent effect which can be achieved according to the invention is based on a modification of the surface structure of the base pigments by uniform coating with the perylene compounds containing sulfonic acid and/or carboxylic acid groups, of the formula II. In a number of cases, the effectiveness of the pigment-dispersing agents and the quality of the pigment preparations produced with these depend on the point in time of the addition of the dispersing agent to the crude pigment and the phase of the preparation process in this respect in which this admixing takes place. In this connection, the manner of the application of the pigment-dispersing agent to the pigment also has a great influence. The effectiveness of the pigment-dispersing agents on the quality of the pigment preparations also depends on the particle size and particle shape of the pigment-dispersing agents and the extent of the pigment surface which can be coated. It may likewise be advantageous for the pigment-dispersing agent to be added directly to the pigment only in the proposed use medium. The particular optimum concentration of the pigment-dispersing agent must be determined by guideline preliminary experiments, since the improvement in the properties of the pigments does not always proceed linearly with the amount of pigment-dispersing agent.

Both mixtures of base pigments a) with in each case one pigment-dispersing agent b) and mixtures of base pigments a) with several pigment-dispersing agents b) at the same time can be used to prepare the pigment preparations claimed. Pigment-dispersing agents containing sulfonic acid groups are in general more effective than those containing carboxyl groups.

The pigment preparations can be prepared in various ways according to the invention. The pigment-dispersing agents can thus be introduced as early as the pigment synthesis stage, during a fine distribution process or during a subsequent solvent finish treatment. The pigment-dispersing agents can be added, for example, in the course of dry grinding of a crude pigment with or without additional grinding auxiliaries on a roll mill or vibratory mill or in the course of wet grinding of a crude pigment in an aqueous, aqueous-organic or organic grinding medium, for example on a bead mill. The addition of the pigment-dispersing agents before or during a print finish for the basic pigment in an aqueous, aqueous-acid or aqueous-organic medium has likewise proved appropriate. The pigment-dispersing agents can also be added to and incorporated into the water-moist pigment press-cake before drying. Finally, it is possible to carry out dry mixing of ground pigment-dispersing agents with the pigment powder.

The pigment preparations according to the invention can be employed, in particular, for pigmenting (coloring) high molecular weight organic materials of natural or synthetic origin:
high molecular weight organic materials which can be colored with the pigment preparations claimed are, for example, cellulose ethers and esters, such as ethylcellulose, nitrocellulose, cellulose acetate and cellulose butyrate, naturally occurring resins or synthetic resins, such as polymerization resins or condensation resins, for example aminoplasts, in particular urea- and melamineformaldehyde resins, alkyd resins, acrylic resins or phenoplasts, polycarbonates, polyolefins, such as polystyrene, polyvinyl chloride, polyethylene or polypropylene, polyacrylonitrile, polyacrylic acid esters, polyamides, polyurethanes or polyester, rubber, casein, silicone and silicone resins, by themselves or as mixtures.

It is unimportant here whether the high molecular weight organic compounds mentioned are present as plastic compositions, melts or in the form of spinning solutions, varnishes, paints or printing inks. Depending on the intended use, it has proved advantageous to employ the pigment preparations according to the invention as toners or in the form of preparations or dispersions. The pigment preparations claimed are employed in an amount of preferably 1 to 10% by weight, based on the high molecular weight organic material to be pigmented. In this respect, particularly preferred varnish systems are stoving varnishes of the alkyd/melamine resin class or acrylic/melamine resin varnishes, as well as two-component varnishes based on acrylic resins which can be crosslinked with polyisocyanate. Of the large number of pigmentable printing inks, printing inks based on nitrocellulose are to be mentioned in particular.

The pigment preparations according to the invention can be dispersed easily and to high degrees of fineness in many use media. These dispersions have a high stability to flocculation and exhibit outstanding rheological properties even in cases of high pigmentation. Finishes and prints of high tinctorial strength, high gloss and high transparency with outstanding fastness properties can be produced with them.

As coloring agents, the pigment preparations are also outstandingly suitable for coloring moldable plastics, in particular polyvinyl chloride, polyethylene and polypropylene. Colorations of high tinctorial strength and very good dispersibility are obtained.

To evaluate the properties of the pigment preparations claimed in varnish systems, an alkyd/melamine resin varnish (AM6) based on a middle-oil, non-drying alkyd resin of synthetic fatty acids and phthalic anhydride and a melamine resin etherified with butanol, and contents of a non-drying alkyd resin based on ricinene acid (shortoil), and an acrylic resin stoving varnish based on a non-aqueous dispersion (TSA-NAD) were chosen from the large number of known systems. Reference is made to this in the following examples by the designation AM6 or TSANAD.

The rheology of the ground material after the dispersion (millbase rheology) is evaluated with the aid of the following five-level scale:
5 thinly liquid
4 liquid
3 viscous
2 slightly gelled
1 gelled After dilution of the ground material to the final pigment concentration, the viscosity was evaluated with a Rossmann Viscospatula model 301 from Erichsen. Gloss measurements were made on cast films at an angle of 20° in accordance with DIN 67530 (ASTMD 523) using the "multigloss" gloss meter from Byk-Mallinckrodt.

The tests in polyvinyl chloride (PVC) were carried out at 130° C. and 160° C.

In the following examples, parts in each case relate to parts by weight and percentages in each case relate to percentages by weight of the substances thus described. The generic terms used for identification of pigments employed according to the invention and the C.I. numbers assigned to these are to be found in the COLOUR INDEX, 3rd edition 1971 and supplements 1975, 1982 and 1987.

EXAMPLE 1

108.9 g of perylene-3,4,9,10-tetracarboxylic acid dianhydride in the moist state, corresponding to 50 g in the dry form, are stirred with 1441 ml of water. 15 g of resin soap (50% strength) and, as the pigment-dispersing agent, 0.5 g of perylene compound of the general formula II in which V is the group $>N-CH_2-CH_2-SO_3^-H^+$, W is the group $-O-$ and n is the number 0 are added to this initial mixture. 185.6 g of monomethylamine solution (27.3% strength) are now added dropwise at 0° to 5° C. in the course of 15 minutes, after which the batch is stirred at 0° to 5° C. for 15 minutes. After a solution of 28.5 g of calcium chloride (anhydrous) and 94.5 ml of water has also been added dropwise in the course of 15 minutes and the components have been subsequently stirred for 1 hour, the reaction mixture is heated to 80° C. and the stirring operation is continued at this temperature for a further 2 hours. The reaction product is then filtered off with suction, washed neutral and chloride-free by treatment with water and dried at 80° C. 57.9 g of a pigment preparation based on C.I. Pigment Red 179 (No. 71130) of the general formula I in which A and B are the group $>N-CH_3$ and n is the number 0 are obtained.

The pigment-dispersing agent contained as the Ca salt in the pigment preparation after the synthesis has the general formula II, but in this V is now the group $>-CH_2-CH_2-SO_3^-X^+$, W is the group $>N-CH_3$, $X^+$ is the metal cation

and n is the number 0.

When the pigment preparation is tested in TSA-NAD varnish, transparent, deep-colored finishes are obtained. The millbase rheology of the product (15% strength) is evaluated with a rating of 4. However, if the addition of the pigment-dispersing agent has been dispensed with in the above measures for preparation of the coloring agent, a pigment with a millbase rheology (15% strength) evaluated with a rating of 1 results.

EXAMPLE 2

108.9 g of perylene-3,4,9,10-tetracarboxylic acid dianhydride in the moist state, corresponding to 50 g in the dry form, are stirred with 1441 ml of water. 15 g of resin soap (50% strength) and, as the pigment-dispersing agent, 0.5 g of perylene compound of the general formula II in which V and W are each the group $>N-CH_2-COO^-H^+$ and n is the number 0 are added to this initial mixture. 185.6 g of monomethylamine solution (27.3% strength) are now added dropwise at 0° to 5° C. in the course of 15 minutes, after which the batch is stirred at 0° to 5° C. for 15 minutes. After a solution of 28.5 g of calcium chloride (anhydrous) and 94.5 ml of water has also been added dropwise in the course of 15 minutes and the components have been subsequently stirred at 0° to 5° C. for 1 hour, the reaction mixture is heated to 80° C. and the stirring operation is continued at this temperature for a further 2 hours. The reaction product is then filtered off with suction, washed neutral and chloride-free by treatment with water and dried at 80° C. 58.4 g of a pigment preparation based on C.I. Pigment Red 179 (No. 71130) of the general formula I in which A and B are the group >N—CH$_3$ and n is the number 0 are obtained.

The pigment-dispersing agent contained as the Ca salt in the pigment preparation after the synthesis has the general formula II, but in which V and W are now each the group >N—CH$_2$—COO$^-$X$^+$, X$^+$ is the metal cation

and n is the number 0.

When the pigment preparation is tested in TSA-NAD varnish, transparent, deep-colored finishes are achieved. The millbase rheology of the product (15% strength) is evaluated with a rating of 4–5. Without the addition of pigment-dispersing agent, the millbase rheology of the coloring agent produced in this way is evaluated with a rating of 1.

EXAMPLE 3

108.9 g of perylene-3,4,9,10-tetracarboxylic acid dianhydride in the moist state, corresponding to 50 g in the dry form, are stirred with 1441 ml of water. 15 g of resin soap (50% strength) and, as the pigment-dispersing agent, 1.25 g of perylene compound of the general formula II in which V and W are each the group >N—CH$_2$—CH$_2$—SO$_3$$^-$H$^+$ and n is the number 0 are added to this initial mixture. 185.6 g of monomethylamine solution (27.3% strength) are now added dropwise at 0° to 5° C. in the course of 15 minutes, after which the batch is stirred at 0° to 5° C. for 15 minutes. After a solution of 28.5 g of calcium chloride (anhydrous) and 94.5 ml of water has also been added dropwise in the course of 15 minutes and the components have been stirred at 0° to 5° C. for 1 hour, the reaction mixture is heated to 80° C. and the stirring operation is continued at this temperature for a further 2 hours. The reaction product is then filtered off with suction, washed neutral and chloride-free by treatment with water and dried at 80° C. 58.9 g of a pigment preparation based on C.I. Pigment Red 179 (No. 71130) of the general formula I in which A and B are the group >N—CH$_3$ and n is the number 0 are obtained.

The Pigment-dispersing agent contained as the Ca salt in the pigment preparation after the synthesis has the general formula II, but in this V and W are now each the group >N—CH$_2$—CH$_2$—SO$_3$$^-$X$^+$, X$^+$ is the metal cation

an n is the number 0.

When the pigment preparation is tested in TSA-NAD varnish, transparent, deep-colored finishes are achieved. The millbase rheology of the product (15% strength) is evaluated with a rating of 4. Without addition of the pigment-dispersing agent, the millbase rheology of the coloring agent prepared in this way is evaluated with a rating of 1.

EXAMPLE 4

30 g of perylene-3,4,9,10-tetracarboxylic acid diimide, produced as the pure pigment analogously to the instructions of Example 1 of European Patent 0,039,912, are introduced into a 1 l plastic container filled with 1400 g of Cylpebs (of corundum, 12 mm diameter; manufacturer: Groh GmbH, Hof) as grinding bodies, and is used as the initial material there. 3 g of perylene compound of the general formula II in which V and W are each the group >N—CH$_2$—CH$_2$—SO$^-$H$^+$ and n is the number 0, as the pigment-dispersing agent, and 3 g of stearylamine are added to this batch and the mixture is now finely ground for 4 hours by shaking on a vibratory mill (®Vibratom type; manufacturer: Siebtechnik Mühlheim) . The ground material is then sieved off from the grinding bodies. 34 g of ground material are obtained.

34 g of the above ground material are introduced into 340 ml of N-methylpyrrolidone. The mixture is then heated to 50° C. and subsequently stirred at this temperature for 2 hours. 200 ml of water are then added and the reaction product is filtered off with suction, washed N-methyl-pyrrolidone-free by treatment with water and dried at 80° C.

32.9 g of a pigment preparation based on C.I. Pigment Brown 26 (No. 71129) of the general formula I in which A and B are the group >N—H and n is the number 0 are obtained.

The pigment-dispersing agent contained as the stearylammonium salt in the pigment preparation after the finishing operation has the general formula II, but in this V and W are now the group >—CH$_2$—CH$_2$—SO$_3$$^-$X$^+$, X$^+$ is the group N$^+$H$_3$[CH$_2$—(CH$_2$)$_{16}$—CH$_3$] and n is the number 0. When the pigment formulation is tested in TSA-NAD varnish, transparent, lighter-colored and redder finishes are achieved than in the case of coloring with a product without the addition of pigment-dispersing agent.

EXAMPLE 5

20 g of perylene-3,4,9,10-tetracarboxylic acid N,N'-bis(4'-methoxyphenylimide), produced as the crude pigment in accordance with the statements of Example 1 in U.S. Pat. No. 2,543,747, are introduced into a 1 liter porcelain vessel filled with 1200 g of quartzite beads (3 mm diameter) as grinding bodies, and is used as the initial material there. 200 ml of acetone, 1.6 g of oleylamine and, as the pigment-dispersing agent, 2 g of perylene compound of the general formula II in which V and W are each the group

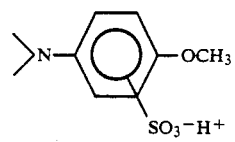

and n is the number 0, are added to the batch and the mixture is now finely ground for 12 hours by shaking on a vibratory mill (as in Example 4). The quartzite beads are then sieved off from the ground material and rinsed with water. The pigment isolated in this way is then filtered off with suction, washed acetone-free with water and dried at 80° C.

22.5 g of a pigment preparation based on C.I. Pigment Red 190 (No. 71140) of the general formula I in which A and B are the group

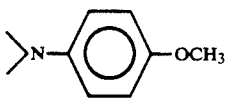

and n is the number 0 are obtained. The pigment-dispersing agent contained as oleylammonium salt in the pigment preparation after the solvent grinding has the general formula II, but in this V and W are now each the group

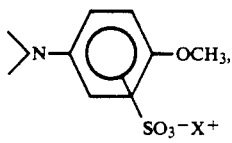

$X^+$ is the group $N^+H_3[CH_2-(CH_2)_7-CH=CH-(CH_2)_7-CH_3]$ and n is the number 0. When the pigment preparation is tested in AM6 varnish, very transparent, deep-colored, pure finishes of high gloss are achieved. In contrast, products obtained without addition of the pigment-dispersing agent give only opaque, weak-colored, cloudy finishes with a good gloss.

EXAMPLE 6

30 g of perylene-3,4,9,10-tetracarboxylic acid N,N'-bis-(3', 5'-dimethylphenylimide), prepared as crude pigment in accordance with the statements of Example 1 of DE-AS 1,067,157, are introduced into a 1.4 liter stainless steel vessel filled with 1400 g of porcelain beads (12 mm diameter) as grinding bodies, and is used as the initial material there. 90 g of sodium sulfate (anhydrous), 0.7 g of stearylamine and, as the pigment-dispersing agent, 0.75 g of perylene compound of the general formula II in which V and W are each the group $>N-CH_2-CH_2-SO_3^-H^+$ and n is the number 0 are then added to this batch and the mixture is now finely ground for 8 hours by shaking on a vibratory mill (as in Example 4). The ground material is then sieved off from the grinding bodies, extracted by stirring by treatment with hot water for 1 hour at 90° C., subsequently filtered off with suction, washed sulfate-free by treatment with water and dried at 80° C. 28.9 g of a pigment preparation based on C.I. Pigment Red 149 (No. 71137) of the general formula I in which A and B are the group

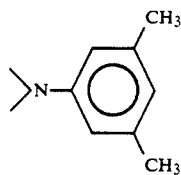

and n is the number 0 are obtained.

The pigment-dispersing agent contained as the stearylammonium salt in the pigment preparation after the salt grinding has the general formula II, but in this V and W are now each the group $>N-CH_2-CH_2-SO_3^-X^+$, $X^+$ is the group $N^+H_3[CH_2-(CH_2)_{16}-CH_3]$ and n is the number 0.

When the pigment preparation is tested in PVC, transparent, light, deep-colored and pure colorations of excellent fastness to bleeding are achieved. In contrast, the pigment prepared without addition of pigment-dispersing agent gives more opaque, darker and bluer colorations in PVC.

EXAMPLE 7

30 g of perylene-3,4,9,10-tetracarboxylic acid N,N'-bis-(4'-ethoxyphenylimide), prepared as the crude pigment in accordance with the statements in Example 1 of German Patent 1,113,773, are introduced into a 1.4 liter stainless steel container filled with 1300 g of porcelain beads as grinding bodies, and is used as the initial material there. After the pigment to be treated has first also been charged with 80 g of sodium sulfate (anhydrous) and 10 g of calcium chloride (anhydrous), first 1.5 g of perylene compound of the general formula II in which V and W are each the group $>N-CH_2-CH_2-SO_3^-H^+$ and n is the number 0, as pigment-dispersing agent 1, and then 1.5 g of perylene compound of the general formula II in which V and W are the group

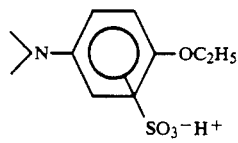

and n is the number 0, as pigment-dispersing agent 2, are also added to the batch. This mixture is now finely ground for 8 hours by shaking on a vibratory mill (as in Example 4). The ground material is then sieved off from the grinding bodies, extracted by stirring with hot water for 1 hour at 90° C., subsequently filtered off with suction, washed sulfate-free by treatment with water and dried at 80° C.

30.8 g of a pigment preparation based on C.I. Pigment Red 123 (No. 71145) of the general formula I in which A and B are the group

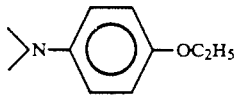

and n is the number 0 are obtained. The pigment-dispersing agent 1 contained as the Ca salt in the pigment preparation after the salt grinding has the general formula II, but in this V and W are now each the group $>N-CH_2-CH_2-X^+$, $SO_3^{-X+}$ is the metal cation $C2a^{2+}$ and n is the number 0, and the pigment-dispersing agent 2 also present as the Ca salt after the salt grinding has the general formula II, but in this V and W are now each the group

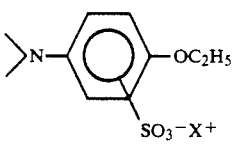

,$X^+$ is the metal cation $$\frac{Ca^{2+}}{2}$$

and n is the number 0.

When the pigment preparation is tested in AM6 varnish, transparent, dark, deep-colored finishes are achieved. The gloss value is 72 and the viscosity of the 5% strength varnish is 7.0". In contrast, products prepared without addition of pigment-dispersing agent produce opaque, light and weaker-colored finishes. The gloss value is then 12 and the viscosity of the 5% strength lacquer is 14.2".

EXAMPLE 8

30 g of perylene-3,4,9,10-tetracarboxylic acid diimide having a bromine content of 25.45%, prepared analogously to the instructions of Example 9 of European Patent 0,039,912, are introduced into a 1.4 liter plastic vessel filled with 1400 g of Cylpebs (as in Example 4), and are used as the initial material there. 3 g of perylene compound of the general formula II in which V and W are the group $>N-CH_2-CH_2-SO_3^-H^+$ and n is the number 0, as the pigment-dispersing agent, and 3 g of stearylamine are also added in succession to the batch, after which this mixture is finely ground for 12 hours on a vibratory mill (as in Example 4) and the ground material is isolated by sieving.

31 g of the above ground material are introduced into 340 ml of N-methylpyrrolidone and the mixture is then heated to 50° C. and subsequently stirred at this temperature for 3 hours. 200 ml of water are then added and the reaction product is filtered off with suction, washed N-methylpyrrolidone-free with water and dried at 80° C. 29.5 g of a pigment preparation based on brominated perylene-3,4,9,10-tetracarboxylic acid diimide of the general formula I in which A and B are the group $>N-H$, D is bromine and n has an average value of 1.7 are obtained.

The pigment-dispersing agent contained as the stearylammonium salt in the pigment preparation after the finishing operation has the general formula II, but in this V and W are now the group $>N-CH_2-CH_2-SO_3^-X^+$, $X^+$ is the group $N^+H_3[CH_2-(CH_2)_{16}-CH_3]$ and n is the number 0.

When the pigment preparation is tested in TSA-NAD varnish, transparent, light, deep-colored, pure finishes are obtained. Without admixing of the pigment-dispersing agent, the finishes with the pigment are opaque, dark and weak-colored. The rheological properties of the two products are about the same. Very transparent, deep-colored, pure colorations are obtained with the above preparation in nitrocellulose gravure printing. Without addition of pigment-dispersing agent, however, the colorations by the coloring agent are more opaque, weaker in color, bluer and cloudier.

EXAMPLE 9

19.2 g of perylene-3,4,9,10-tetracarboxylic acid N,N'-di(methylimide), prepared analogously to the instructions of Example 1 of European Patent 0,088,392 without addition of surface-active agents, are mixed with 0.8 g of perylene compound of the general formula II in which V and W are the group $>N-CH_2-CH_2-SO_3^-H^+$ and n is the number 0, as the pigment-dispersing agent. A pigment preparation based on C.I. Pigment Red 179 (No. 71130) is obtained. When the pigment preparation is tested in TSA-NAD varnish, transparent, light, very deep-colored and pure finishes of high gloss are achieved. Metallic finishes produced with this varnish are very deep-colored and pure. The millbase rheology of the product (15% strength) is evaluated with a rating of 5. Without admixing of the pigment-dispersing agent, the colorations with the coloring agent are more opaque and weaker in color. The millbase rheology (15% strength) is then evaluated with a rating of 1.

EXAMPLE 10

17.6 g of perylene-3,4,9,10-tetracarboxylic acid N,N'-di(methylimide), prepared analogously to the instructions of Example 1 of European Patent 0,088,392 without addition of surface-active agents, are mixed with 2.4 g of perylene compound of the general formula II in which V and W are the group $>N-CH_2-CH_2-SO_3^-H^+$ and n is the number 0, as the pigment-dispersing agent. A pigment preparation based on C.I. Pigment Red 179 (No. 71130) is obtained. When the pigment preparation is tested in TSA-NAD varnish, transparent, light, very deep-colored and pure finishes of high gloss are achieved. Metallic finishes produced with the varnish are very deep-colored and pure. The millbase rheology of the product (15% strength) is evaluated with a rating of 5. In the absence of the pigment-dispersing agent, colorations obtained with the coloring agent are more opaque and weaker in color. The millbase rheology (15% strength) is evaluated with a rating of 1 in this case.

EXAMPLE 11

Use Example a) Full shade varnish (15% strength)

A mixture of 27 g of an acrylic resin varnish (with a solids content of 25%), 4.86 g of perylene-3,4,9,10-tetracarboxylic acid N,N'-dimethylimide (C.I. Pigment Red 179), prepared analogously to the instructions of Example 1 of European Patent 0,088,392 without addition of surface-active agents, and, as the pigment-dispersing agent, 0.54 g of perylene compound of the general formula II in which V and W are the group $>N-CH_2-CH_2-SO_3^-H^+$ and n is the number 0, is shaken in a closed plastic beaker together with 60 ml of quartzite beads (3 mm diameter) on a paint shaker for 60 minutes. 3.6 g of an acrylic resin (with a solids content of 51%) are then added in portions, while stirring, and the batch is shaken on the paint shaker for a further 5 minutes, after which the quartz beads are removed by sieving.

The resulting varnish paint has a pigment content of 15%. The millbase rheology thereof is evaluated with a rating of 5. In the case of a corresponding full shade varnish, but produced without the pigmentdispersing agent, the millbase rheology of the product is evaluated with a rating of 1.

b) Full shade varnish (6% strength)

54 g of a melamine resin varnish (with a solids content of 43%) are added to the 15% strength full shade varnish prepared under part a), while stirring. The mixture is then shaken on the paint shaker for 5 minutes.

The 6% strength full shade varnish thus obtained is drawn, using a hand coater, onto a white strip of card, on the upper end of which a black stripe is printed, and then stoved in a drying cabinet at 140° C. for 30 minutes.

A transparent, light, deep-colored, high-gloss finishing is obtained over the white and black background. Without admixing of the pigment-dispersing agent, the finishing from the coloring agent is more opaque and weaker in color.

We claim:

1. Pigment preparations comprising
a) as the base pigment at least one perylene compound of the general formula I

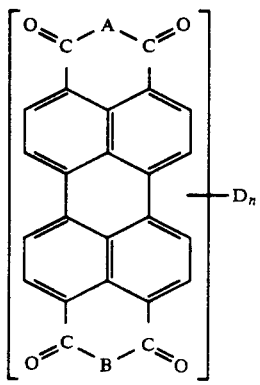 (I)

in which

A is a bivalent radical —O— or >NR$^1$ and

B is a bivalent radical —O— or >NR$^2$,

D is a chlorine or bromine atom, and if n>1, optionally a combination thereof, and n is a number from 0 to 4; in which, in the above radicals A and B, then R$^1$ and R$^2$ independently of one another are each a hydrogen atom or a C$_1$-C$_4$-alkyl group, or a phenyl group, which can be unsubstituted or mono- or polysubstituted by halogen, C$_1$-C$_4$-alkyl, C$_1$-C$_4$-alkoxy, or phenylazo; and b) as the pigment-dispersing agent at least one perylene compound of the general formula II

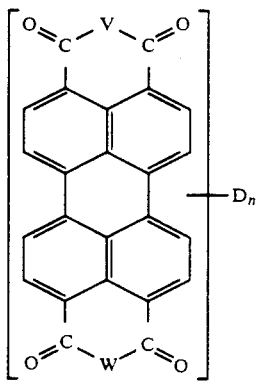 (II)

in which

V is a bivalent radical —O—, >NR$^3$ or >N—R$^4$—Y$^-$X$^+$ and

W is the bivalent radical >N—R$^4$—Y$^-$X$^+$,

D is a chlorine or bromine atom, and if n>1, optionally a combination thereof, and n is a number from 0 to 4; in which, in the above radicals V and W, then R$^3$ is a hydrogen atom or a C$_1$-C$_{18}$-alkyl group, or is a phenyl group, which can be unsubstituted or mono- or polysubstituted by halogen, C$_1$-C$_4$-alkyl, C$_1$-C$_4$-alkoxy or phenylazo, R$^4$ is a C$_1$-C$_{18}$-alkylene group, which can be interrupted once or several times within the C—C chain by a bridge member from the series —O—, —NR$^5$—, —S—, phenylene, —CO—, —SO$_2$— and —CR$^6$R$^7$—, or a chemically appropriate combination thereof, and in which in turn the constituents R$^5$, R$^6$ and R$^7$ independently of one another are each a hydrogen atom or a C$_1$-C$_4$-alkyl group, which can be unsubstituted or substituted by a heterocyclic radical, or is a phenylene group, which can be unsubstituted or mono- or polysubstituted by C$_1$-C$_4$-alkyl or C$_1$-C$_4$-alkoxy, Y$^-$ is one of the anionic radicals —SO$_3^-$ or —COO$^-$ and X$^+$ is the hydrogen ion H$^+$ or the equivalent

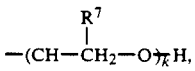

of a metal cation from main group 1 to 5 or from subgroup 1 or 2 or 4 to 8 of the periodic table of the chemical elements, in which m is one of the numbers 1, 2 or 3;

or is an ammonium ion N$^+$R$^8$R$^9$R$^{10}$R$^{11}$, in which the substituents R$^8$, R$^9$, R$^{10}$ and R$^{11}$ on the quaternary nitrogen atom independently of one another are each a hydrogen atom or one of the following radicals: C$_1$-C$_{30}$-alkyl, C$_1$-C$_{30}$-alkenyl, C$_5$-C$_{30}$-cycloalkyl, unsubstituted or C$_1$-C$_8$-alkylated phenyl or a (poly)alkylenoxy group $$-(CH-CH_2-O)_{\overline{k}}H,\overset{R^7}{\underset{|}{}}$$

in which R$^8$ is hydrogen or C$_1$-C$_4$-alkyl and k is a number from 1 to 30, and in which alkyl, alkenyl, cycloalkyl, phenyl or alkylphenyl designated as R$^8$, R$^9$, R$^{10}$ and/or R$^{11}$ can also optionally be substituted by amino, hydroxyl and/or carboxyl;

or in which the substituents R$^8$ and R$^9$, together with the quaternary nitrogen atom, can form a five- to seven-membered saturated ring system, which optionally also contains further hetero atoms; or in which the substituents R$^8$, R$^9$ and R$^{10}$, together with the quaternary nitrogen atom, can form a five- to seven-membered aromatic ring system, which optionally also contains further hetero atoms and to which additional rings are optionally fused.

2. Pigment preparations according to claim 1, wherein, the base pigment a) present is at least one perylene compound of the general formula I given therein, in which A is a bivalent radical —O— or >NR$^1$ B is a bivalent radical —O— or >NR$^2$ and D and n are as defined above, with the proviso that the particular meaning of the above radicals A and B is the same, and in which then R$^1$ and R$^2$ correspondingly are each a hydrogen atom or one of the following radicals: methyl or the structures

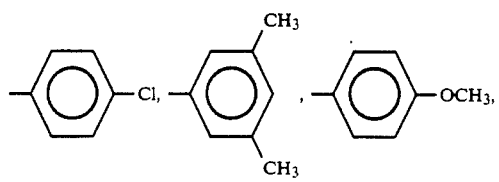

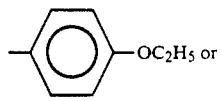

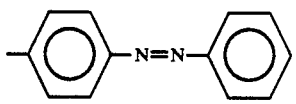

3. Pigment preparations according to claim 1, wherein the pigment-dispersing agent b) present is at least one perylene compound of the general formula II given therein, in which
V is a bivalent radical —O—, >NR$^3$ or >N—R$^4$—Y$^-$X$^+$,
W is the bivalent radical >N—R$^4$—Y$^-$X$^+$ and
D and n are as defined in claim 1, in which, in the above radicals V and W, then
R$^3$ is a hydrogen atom or a C$_1$–C$_4$-alkyl group, or is a phenyl group, which can be unsubstituted or substituted by chlorine, bromine, methyl, ethyl, methoxy and/or ethoxy,
R$^4$ is a straight-chain or branched C$_1$–C$_6$-alkylene group, or a phenylene group, which can be unsubstituted or substituted by methyl, ethyl, methoxy and/or ethoxy,
Y$^-$ is one of the anionic radicals —SO$_3^-$ or —COO$^-$ and
X$^+$ is the hydrogen ion H$^+$ or the equivalent $$\frac{M^{m+}}{m}$$

of a metal cation as in claim 1, from the series Li$^{1+}$, Na$^{1+}$, K$^{1+}$, Mg$^{2+}$, Ca$^{2+}$, Sr$^{2+}$, Ba$^{2+}$, Mn$^{2+}$, Cu$^{2+}$, Ni$^{2+}$, Cd$^{2+}$, Co$^{2+}$, Zn$^{2+}$, Fe$^{2+}$, Al$^{3+}$, Cr$^{3+}$ or Fe$^{3+}$; or is an ammonium ion N$^+$R$^8$R$^9$R$^{10}$R$^{11}$, in which the substituents R$^8$, R$^9$ and R$^{10}$ on the quaternary nitrogen atom independently of one another are each a hydrogen atom or the group C$_2$–C$_3$-hydroxyalkyl and R$^{11}$ is one of the groups from the series C$_1$–C$_{30}$-alkyl, C$_1$–C$_{30}$-alkenyl, C$_2$–C$_3$-hydroxyalkyl and C$_5$–C$_6$-cycloalkyl.

4. Pigment preparations according to claim 1, wherein the pigment-dispersing agent b) present is at least one halogen-free perylene compound of the general formula II given therein, in which
V is a bivalent radical —O—, >NR$^3$ or >N—R$^4$—SO$_3^-$X$^+$,
W is the bivalent radical >N—R$^4$—SO$_3^-$X$^+$ and
n is the number 0, in which, in the above radicals V and W, then
R$^4$ is ethylene or propylene or the structures

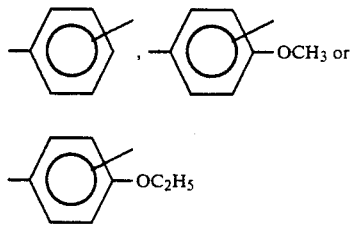

and
X$^+$ is a cation from the series comprising H$^+$, $$\frac{Ca^{2+}}{2},$$

N$^+$H$_3$[CH$_2$—(CH$_2$)$_{16}$—CH$_3$] or
N$^+$H$_3$[CH$_2$—(CH$_2$)$_7$—CH=CH—(CH$_2$)$_7$—CH$_3$].

5. Pigment preparations according to claim 1, wherein the pigment-dispersing agent b) present is at least one halogen-free perylene compound of the general formula II given therein, in which
V is a bivalent radical —O—, >NR$^3$ or >N—R$^4$—COO$^-$X$^+$,
W is the bivalent radical >N—R$^4$—COO$^-$X$^+$ and
n is the number 0, in which, in the above radicals V and W, then
R$^4$ is C$_1$–C$_6$-alkylene or the structure

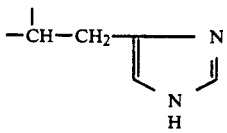

and
X$^+$ is one of the cations H$^+$, $$\frac{Ca^{2+}}{2},$$

N$^+$H$_3$[CH$_2$—(CH$_2$)$_{16}$—CH$_3$] or
N$^+$H$_3$[CH$_2$—(CH$_2$)$_7$—CH=CH—(CH$_2$)$_7$—CH$_3$].

6. Pigment preparations according to claim 1, wherein the pigment-dispersing agents b) which contain di- or monosulfonic acid and di- or monocarboxylic acid groups and are present therein have been prepared by condensation of perylene-3,4,9,10-tetracarboxylic acid with primary aliphatic or aromatic amines containing sulfonic acid or carboxylic acid groups, of the formula III $$H_2N-R^4-Y^-X^+ \qquad (III).$$

7. Pigment preparations according to claim 1, essentially consisting of
a) 99.5 to 80% by weight of at least one perylene compound of the formula I (base pigment),
b) 0.5 to 15% by weight of at least one perylene compound of the formula II (dispersing agent),
c) 0 to 5% by weight of a nonionic surfactant, the amounts of the particular components being based on the total weight of the preparation.

8. Process for the preparation of a pigment preparation defined according to claim 1, wherein the surface structure of the base pigments a) is uniformly coated with one or more pigment-dispersing agents b).

9. Process according to claim 8, wherein the pigment-dispersing agents b) are added to the reaction medium during the synthesis of the base pigments a).

10. Process according to claim 8, wherein the pigment-dispersing agents b) are added to the water-moist press-cake of the base pigments a).

11. Process according to claim 8, wherein the pigment-dispersing agents b), in the case of fine distribution of the dried crude pigments a), are added in the course of dry grinding or wet grinding.

12. Process according to claim 8, wherein the pigment-dispersing agents b) are added in the course of a solvent finish treatment of base pigments a).

13. Process according to claim 8, wherein the pigment-dispersing agents b) are mixed with pulverulent base pigments a) in the dry state.

14. Pigment preparations according to claim 1, comprising a base pigment of at least one perylene compound of said formula I, having coated on the surface of said base pigment at least one perylene compound of said formula II as a pigment-dispersing agent.

15. Pigment preparations according to claim 14 wherein said preparations are in the form of free-flowing powder or granules.

16. A method of using a pigment preparation according to claim 1, comprising the step of pigmenting a high molecular weight organic material with said preparation, wherein said high molecular weight organic material is in the form of a plastic composition, a melt, a spinning solution, a varnish, a paint, or a printing ink.

17. A pigmented high molecular weight organic material containing 1 to 10% by weight, based on the weight of the high molecular weight organic material to be pigmented, of a pigment preparation according to claim 1.

18. An alkyd-melamine or acrylic melamine resin varnish or a two-component varnish comprising acrylic resin which can be crosslinked with polyisocyanate, said varnish having been pigmented with a pigment preparation according to claim 1.

19. A pigmented nitrocellulose-based printing ink containing a pigment preparation according to claim 1.

20. A pigmented moldable high molecular weight organic plastic containing a pigment preparation according to claim 1.

* * * * *